US 6,192,202 B1

(12) United States Patent
Doi

(10) Patent No.: US 6,192,202 B1
(45) Date of Patent: Feb. 20, 2001

(54) IMAGE FORMING SYSTEM USING PLURAL COPYING APPARATUS TO PERFORM ONE COPY JOB

(75) Inventor: Takashi Doi, Fuchu (JP)

(73) Assignee: Toshiba TEC Kabushiki Kaisha, Tokyo (JP)

(*) Notice: Under 35 U.S.C. 154(b), the term of this patent shall be extended for 0 days.

(21) Appl. No.: 09/504,953

(22) Filed: Feb. 16, 2000

(51) Int. Cl.[7] .................................................. G03G 15/00
(52) U.S. Cl. .................................................. 399/8; 399/82
(58) Field of Search ........................................ 399/2, 8, 82

(56) References Cited

U.S. PATENT DOCUMENTS

| 5,333,286 | * | 7/1994 | Weinberger et al. | 399/8 X |
| 5,809,363 | * | 9/1998 | Kitamura et al. | 399/8 |
| 6,031,631 | * | 2/2000 | Tahara et al. | 399/2 X |

* cited by examiner

Primary Examiner—Fred L. Braun
(74) Attorney, Agent, or Firm—Foley & Lardner

(57) ABSTRACT

In tandem copy, an external controller assigns a minimum print copy number to a slave image forming apparatus from a total print copy number. The external controller assigns a remainder print copy number, which is obtained by subtracting the minimum print copy number assigned to the slave image forming apparatus from the total print copy number, to a master image forming apparatus, and instructs starting of printing out. When detecting that printing of all assigned copy number is completed in the slave and a new interrupt print job (other job print request) has come in, the external controller starts a new print job in the slave. When detecting that the interrupt printing in the slave is completed, the external controller suspends printing in the master and inquires of the master about a non-output copy number. Similarly with the print start time, the external controller redistributes a minimum print copy number to the slave and also redistributes a remainder of the non-output copy number, from which the minimum print copy number redistributed to the slave has been subtracted, to the master. The external controller thus resumes the tandem copy.

9 Claims, 4 Drawing Sheets

IMAGE FORMING SYSTEM USING PLURAL COPYING APPARATUS TO PERFORM ONE COPY JOB

BACKGROUND OF THE INVENTION

The present invention relates to an image forming system for performing a tandem copying operation in which images are simultaneously formed and output by a plurality of image forming apparatuses on the basis of image data input by one image forming apparatus.

According to a prior-art technique, in an image forming system comprising two image forming apparatuses, image data input from an input section of one of the image forming apparatuses is stored in an image management section of this image forming apparatus and also transferred to and stored in an image management section of the other image forming apparatus via an external interface. On the basis of the image data, images are simultaneously formed and output by the two image forming apparatuses and thus the image formation performance of the whole image forming system is enhanced.

In addition, in the above image forming system, in order to control output numbers of the two image forming apparatuses, there is known a method of assigning initial output numbers to the two image forming apparatuses according to their image formation performances. In this case, if one of the apparatuses does not complete an assigned output number while the other has completed an assigned output number and the output number is not less than a predetermined minimum redistribution number, the output number is redistributed to the two apparatuses, thus forming and outputting images. Thereby, the performance (image formation performance) of the whole system is enhanced.

In this image forming system, however, where image data input from one of the two image forming apparatuses is simultaneously output from the two image forming apparatuses and another image formation output needs to be executed by one of the two image forming apparatuses, a control for said another image forming output is not executed until the output number assigned to said one image forming apparatus is completed. Thus, there arises a problem in that an immediate interrupt cannot be effected.

BRIEF SUMMARY OF THE INVENTION

The object of the present invention is to provide an image forming system wherein where a plurality of image forming apparatuses are used to form and output images, a control for another image formation output can be quickly executed in the image forming apparatus.

In order to achieve the object, according to the present invention, there is provided an image forming system wherein a plurality of image forming apparatuses are connected to a controller for controlling the image forming apparatuses, each of the image forming apparatuses comprising: setting means for setting image formation of a desired copy number with use of the plurality of image forming apparatuses, with an image on an original being read; read means for optically scanning the original and reading an image; first memory means for storing image data read by the read means or image data transmitted from the controller; and first transmission means for transmitting the image data read by the read means to the controller, the controller comprising: second memory means for storing the image data transmitted by the first transmission means; second transmission means for transmitting the image data stored in the second memory means to an image forming apparatus other than the image forming apparatus which has read the original; first control means for executing, when the reading by the read means has been finished, a control to distribute a predetermined minimum image formation copy number to the image forming apparatus to which the second transmission means has transmitted the image data, and to distribute a remainder image formation copy number, which is obtained by subtracting the minimum image formation copy number from a desired image formation copy number set by the setting means, to the image forming apparatus which has read the original; and second control means for executing a control to suspend image formation in the image forming apparatus which has read the original, when image formation of the predetermined minimum image formation copy number distributed by the first control means is finished, to redistribute the predetermined minimum image formation copy number to the image forming apparatus to which the second transmission means has transmitted the image data, and to redistribute a remainder image formation copy number, which is obtained by subtracting the minimum image formation copy number from the suspended image formation copy number, to the image forming apparatus which has read the original.

According to the present invention, there is also provided an image forming system wherein a first image forming apparatus and a second image forming apparatus are connected to a controller for controlling them, the first image forming apparatus comprising: setting means for setting image formation of a desired copy number with use of the first and second image forming apparatuses, with an image on an original being read; read means for optically scanning the original and reading an image; first memory means for storing image data read by the read means or image data transmitted from the controller; and first transmission means for transmitting the image data read by the read means to the controller, the controller comprising: second memory means for storing the image data transmitted by the first transmission means; second transmission means for transmitting the image data stored in the second memory means to the second image forming apparatus; first control means for executing, when the reading by the read means has been finished, a control to distribute a predetermined minimum image formation copy number to the second image forming apparatus, and to distribute a remainder image formation copy number, which is obtained by subtracting the minimum image formation copy number from a desired image formation copy number set by the setting means, to the first image forming apparatus; and second control means for executing a control to suspend image formation in the first image forming apparatus, when image formation in the second image forming apparatus of the predetermined minimum image formation copy number distributed by the first control means is finished, to redistribute the predetermined minimum image formation copy number to the second image forming apparatus, and to redistribute a remainder image formation copy number, which is obtained by subtracting the minimum image formation copy number from the suspended image formation copy number, to the first image forming apparatus.

DETAILED DESCRIPTION OF THE INVENTION

An embodiment of the present invention will now be described with reference to the accompanying drawings.

Figure 1:
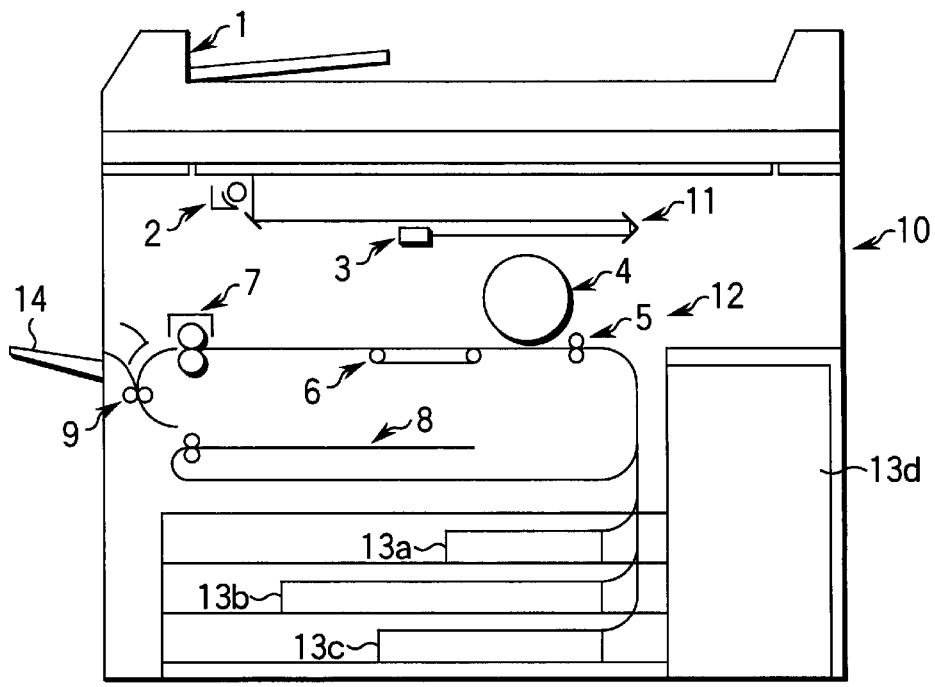
FIG. 1 is a cross-sectional view showing a schematic cross-sectional structure of an image forming apparatus according to the present invention.

FIG. 1 shows a schematic cross-sectional structure of an image forming apparatus according to the present invention. Specifically, this image forming apparatus 10 comprises a scanner 11 and a printer 12, and an automatic document feeder (ADF) 1 is mounted on an upper part thereof.

The scanner unit 11 serving as reading means includes a read light source (lamp) 2 as a light source, and a CCD sensor 3 for receiving reflection light from an original. The scanner unit 11 comprises a driving system (not shown) for varying positions of the respective elements including the light source 2.

In the printer unit 12 serving as image forming means, for example, a laser optical system is combined with an electrophotographic system capable of forming an image on transfer paper. Specifically, the printer 12 has a photosensitive drum 4 functioning as an image carrying body rotatably supported at a substantially central region within the apparatus. The printer 12 comprises register rollers 5, a transfer belt 6, a fixing device 7, an automatic double-side unit (ADU) 8, a reversing unit 9, etc.

Sheet feed cassettes 13a, 13b, 13c serving as sheet feed means are vertically stacked so as to be removable from a front side of the image forming apparatus 10. Copying paper sheets are stored in the sheet feed cassettes 13a, 13b, 13c. The copying paper sheets stored in the sheet feed cassettes 13a, 13b, 13c are picked up from an uppermost one by pickup rollers (not shown) and taken out.

A large-capacity sheet feeder (LCF) 13d is provided on a right side of the image forming apparatus 10. Copying paper sheets stored in the large-capacity sheet feeder 13d are picked up and taken out from an uppermost one by pickup rollers (not shown). A copying paper sheet fed to a take-out end side of the large-capacity sheet feeder 13d is conveyed toward the printer 12.

A finisher (FINISHER) 14 for discharging a paper sheet on which an image has been formed in the printer unit 12 is provided on a left side of the image forming apparatus 10.

Figure 2:
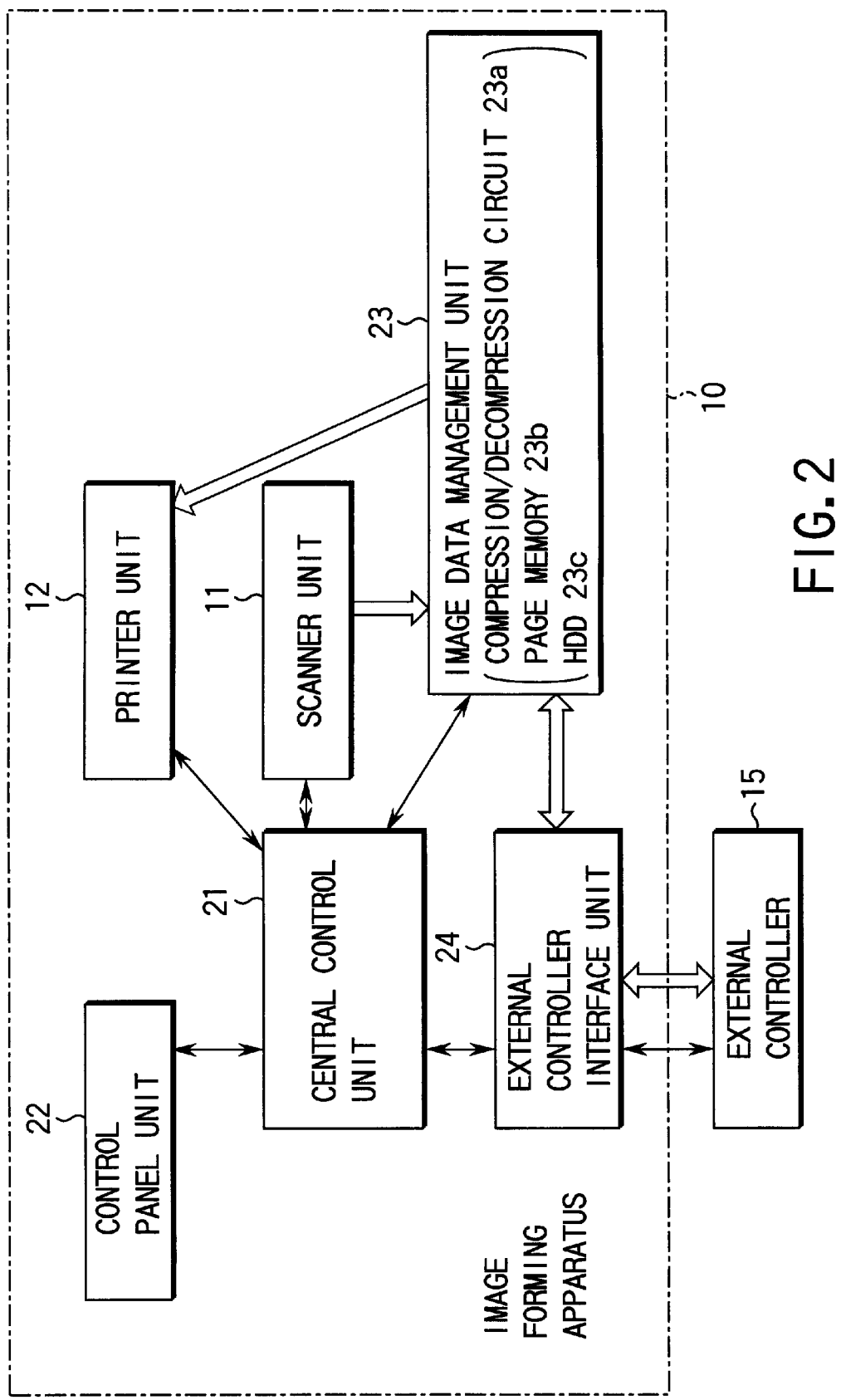
FIG. 2 shows a schematic structure of the image forming apparatus according to the invention.

FIG. 2 shows a schematic structure of the image forming apparatus according to the present invention. The image forming apparatus 10 comprises a central control unit 21 for controlling the entirety of the apparatus, a control panel unit 22 serving as an input/output interface with a user, the printer unit 12 for effecting printing on paper sheets, the scanner unit 11 for reading originals, an image data management unit 23 having memory means for compressing/decompressing and storing image data, and an external controller interface unit 24 for communication with the external controller 15.

The image data management unit 23 includes a compression/decompression circuit 23a for compressing/decompressing image data, a page memory 23b for storing image data in units of a page, and a hard disk drive (HDD) 23c for storing image data.

In the image forming apparatus 10 the central control unit 21, control panel unit 22, image data management unit 23, external controller interface unit 24, scanner unit 11 and printer unit 12 are connected via control interfaces. The control interfaces are indicated by single-line arrows in the figure. The central control unit 21 controls and synchronizes the scanner unit 11, printer unit 12, control panel unit 22, image data management unit 23, and external controller interface unit 24. Thus, the respective functions of the image forming apparatus 10 are realized.

The scanner unit 11, printer unit 12, central control unit 21, image data management unit 23, and external controller interface unit 24 are connected via image data interfaces. The image data interfaces are indicated by white-line arrows in the figure. Image data is transmitted among the image data management unit 23, scanner unit 11, printer unit 12, external controller interface unit 24, with the image data management unit 23 functioning as a hub.

The image forming apparatus 10 is connected to the external controller 15 via the external controller interface unit 24 so that the image forming apparatus 10 can receive and transmit image data from and to the external controller 15.

The external controller 15 can read data on the state of the image forming apparatus 10 via the external controller interface unit 24 and can control the central control unit 21 and control panel unit 22 via the external controller interface unit 24.

Figure 3:
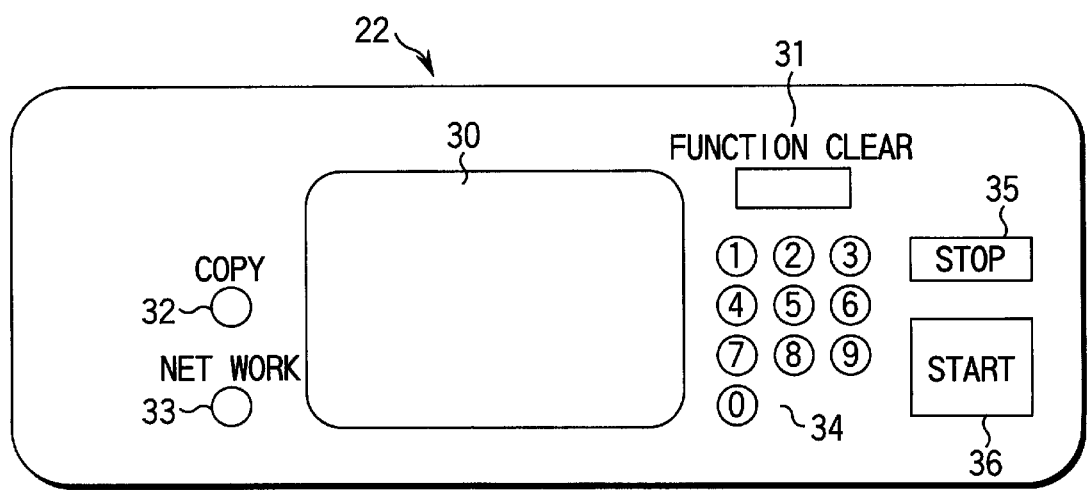
FIG. 3 shows a structure of a control panel unit.

FIG. 3 shows a structure of the control panel unit 22 serving as an input/output interface with the user of the image forming apparatus 10.

The control panel unit 22 is provided with an LCD touch panel 30 comprising a liquid-crystal display (LCD) for displaying various information and a touch panel serving as input means.

A message to the user is displayed on the LCD touch panel 30, and an input by the user is effected through the LCD touch panel 30 and hard keys 31 to 36.

The LCD touch panel 30 is provided with two display functions, that is, a copying-related display function used to effect display relating to a copying function and to effect various settings, and a network-related display function used to display and set various states of the network. These functions are switched by function switch keys 32 and 33.

A clear key 31 is used to clear input data, set values, etc.

The copying function switch key 32 switches display to the copying function, when the network function is being displayed.

The network function switch key 33 switches display to the network function, when the copying function is being displayed.

Ten-keys 34 are used to input numerals.

The stop key 35 is used to interrupt operations, etc.

The start key 36 is used to start operations.

Connection between the image forming apparatus and external apparatus will now be described.

Figure 4:
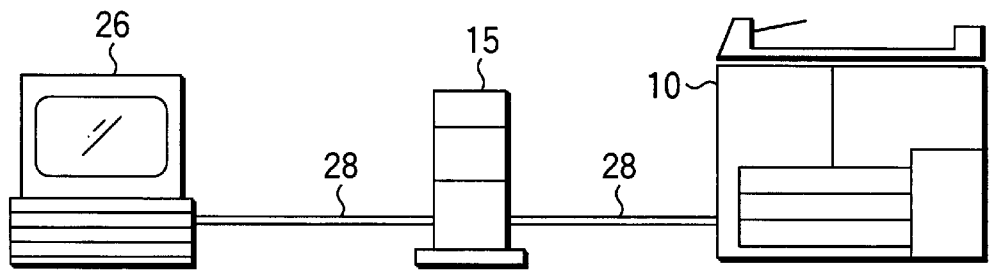
FIG. 4 shows an example of an image forming apparatus connected to an external apparatus.

FIG. 4 shows an example of the image forming apparatus 10 connected to an external apparatus (an image input/output controller in this example).

The external controller 15 is connected to the external controller interface unit 24 provided in the image forming apparatus 10 over a cable 28 comprising a control interface and an image data interface. A client 26 comprising a personal computer, etc. is connected to the external controller 15 over a similar cable 28.

With this connection, image data read by the scanner unit 11 of image forming apparatus 10 can be read in the external controller 15, or image data sent from the external controller 15 can be printed by the printer unit 12.

The external controller 15 serving as the external apparatus can perform an input/output control for the network function of the LCD touch panel 30 of the image forming apparatus 10 using the control interfaces.

In addition, the external controller may be connected to a plurality of clients 26 to perform input/output of image data, etc.

Figure 5:
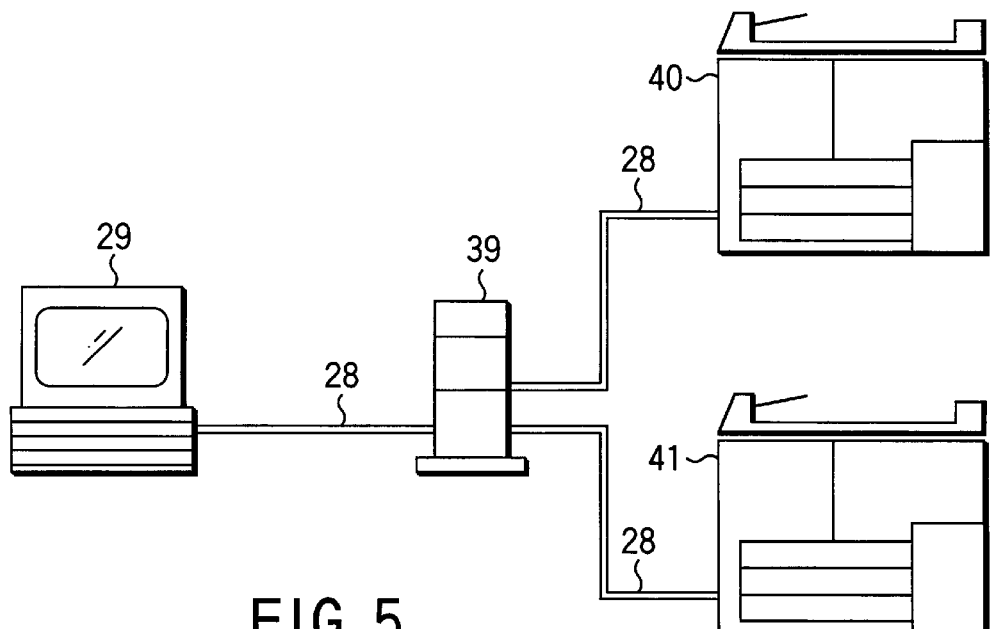
FIG. 5 shows an example of the structure of an image forming system in which two image forming apparatuses are connected.

FIG. 5 shows an example of the structure of an image forming system according to the present invention in which two image forming apparatuses are connected. An external controller 39 has two interfaces connected to image forming apparatuses 40 and 41 via cables 28. Using control interfaces and image data interfaces, the controller 39 effects input/output of image data with the two image forming apparatuses and a control for the control panel units 22. A client 29 comprising a personal computer, etc. is connected to the external controller 39 via a cable 28. The image forming apparatus 40, 41 has the very same structure as the image forming apparatus 10.

With the structure shown in FIG. 5, a tandem copying operation is defined such that image data is input from one of the plural image forming apparatuses and on the basis of the input image data, images are formed and output from the plural image forming apparatuses.

Figure 6:
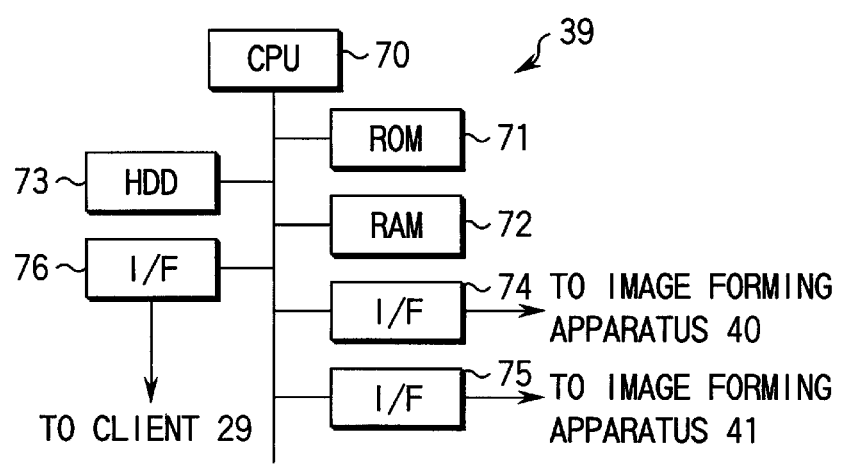
FIG. 6 shows a schematic structure of an external controller.

FIG. 6 shows a schematic structure of the external controller 39. The external controller 39 comprises a CPU 70 for performing an entire control, a ROM 71 for storing control programs, a RAM 72 for temporarily storing data, a hard disk drive (HDD) 73 for storing image data, interfaces 74 and 75 connected to image forming apparatuses 40 and 41, and an interface 76 connected to the client 29.

Figure 7:
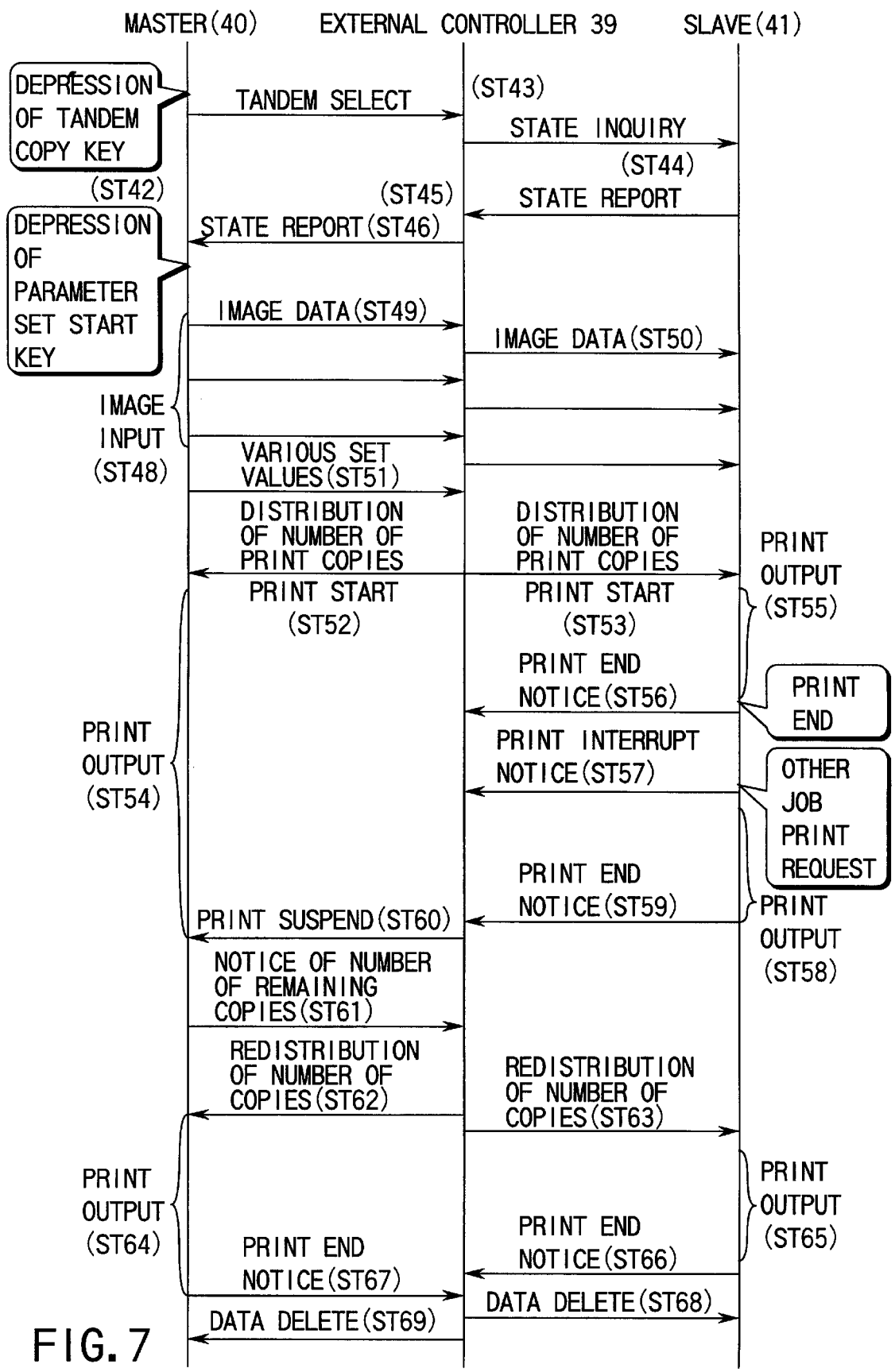
FIG. 7 is a timing chart illustrating execution of a tandem copying operation.

A tandem copying operation in the image forming system of the present invention with the structure shown in FIG. 5 will now be described with reference to a timing chart of FIG. 7.

In the image forming system shown in FIG. 5, the user selects "tandem copy" on the LCD touch panel 30 on the control panel unit 22 of image forming apparatus 40 (ST42).

The external controller 39 detects the selection of the tandem copy by the image forming apparatus 40 (ST43).

The CPU 70 in the external controller 39 inquires of the image forming apparatus 41 as to whether the tandem copy is acceptable (ST44). If it is acceptable, the CPU 70 receives state reports on the printing speed of the image forming apparatus, currently printable sheet sizes, etc. (ST45). The CPU 70 notifies the image forming apparatus 40 of the state reports and the acceptance of tandem copy (ST46).

In this case, the image forming apparatus 40 is referred to as a master of tandem copy and the image forming apparatus 41 as a slave of tandem copy. Hereinafter, these apparatuses are described as the master 40 and slave 41.

The central control unit 21 of the master 40 reflects on the control panel 22 the state of the slave 41 reported from the external controller 39.

After finishing various settings for tandem copy on the control panel of the master 40, the user depresses the start key 36 (ST47).

When the start key 36 is depressed, the central control unit 21 in the master 40 reads image data from the original by means of the scanner unit 11 (ST48), compresses the read image data by means of the compression/decompression circuit 23a of image data management unit 23, and stores the compressed data in the HDD 23c. In addition, the central control unit 21 of the master 40 transfers the compressed image data to the external controller 39 via the external controller interface unit 24 (ST49).

The CPU 70 of the external controller 39 stores the received image data in the HDD 73 and transfers the image data in the compressed state to the slave 41 (ST50).

The central control unit 21 of the slave 41 receives the image data via the external controller interface unit 24 and stores the image data in the HDD 23c of the image data management unit 23.

The CPU 70 of the external controller 39 acquires set values for tandem copy from the master 40 after the image data has been input from the scanner unit 11 of the master 40 and all the input image data has been received (ST51).

The CPU 70 of the external controller 39 distributes a minimum print copy number to the slave 41 from a total print copy number included in the set values, and distributes a remainder of the total print copy number, from which the minimum print copy number assigned to the slave 41 has been subtracted, to the master 40. The CPU 70 instructs both printer units 12 to start printing out (ST52) (ST53).

The image forming apparatuses of master 40 and slave 41 print out copies of the respective assigned print copy numbers through the printer units 12 (ST54) (ST55).

If the CPU 70 of the external controller 39 detects that the printing of all copies of the assigned copy number is finished in the slave 41 (ST56) and that a new print interrupt (other job print request) has come in (ST57), the CPU 70 starts new printing in the slave 41 (ST58).

If the CPU 70 of the external controller 39 detects the end of the interrupt print in the slave 41 (ST59), the CPU 70 suspends the printing in the master 40 (ST60) and inquires of the master 40 about the remainder number of copies which are yet to be output.

The central control unit 21 of the master 40 notifies the external controller 39 of the remainder copy number via the external controller interface unit 24 (ST61).

Similarly with the print start time, the CPU 70 of the external controller 39 redistributes a minimum print copy number to the slave 41 and also redistributes a remainder of the total print copy number, from which the minimum print copy number assigned to the slave 41 has been subtracted, to the master 40 (ST62) (ST63). The CPU 70 thus resumes the tandem copy.

The image forming apparatuses of master 40 and slave 41 print out copies of the respective assigned print copy numbers through the printer units 12 (ST64) (ST65).

As has been described above, if there is an interrupt print job on the slave 41, distribution for tandem copy is suspended until the interrupt print is completed, and the master 40 continues printing out for tandem copy.

Upon receiving notification of the end of printing in both image forming apparatuses of master 40 and slave 41 (ST66) (ST67), the CPU 70 of the external controller 39 notifies the image forming apparatuses (40, 41) of the end of the tandem copy job and instructs deletion of the image data stored in the HDDs 23c of the image forming apparatuses (ST68) (S69).

The image forming apparatuses 40 and 41 delete the image data stored in their HDDs 23c.

As has been described above, according to the embodiment of the present invention, even after the tandem copy has been started, a new print job can be quickly started in the slave-side image forming apparatus since a minimum print copy number is always distributed to the slave.

Moreover, the master can execute the tandem copy even while another print job is being executed in the slave.

What is claimed is:

1. An image forming system wherein a plurality of image forming apparatuses are connected to a controller for controlling the image forming apparatuses, each of the image forming apparatuses comprising:

setting means for setting image formation of a desired copy number with use of said plurality of image forming apparatuses, with an image on an original being read;

read means for optically scanning the original and reading an image;

first memory means for storing image data read by the read means or image data transmitted from the controller; and first transmission means for transmitting the image data read by the read means to the controller, said controller comprising:

second memory means for storing the image data transmitted by the first transmission means;

second transmission means for transmitting the image data stored in the second memory means to an image forming apparatus other than the image forming apparatus which has read the original;

first control means for executing, when the reading by the read means has been finished, a control to distribute a predetermined minimum image formation copy number to the image forming apparatus to which the second transmission means has transmitted the image data, and to distribute a remainder image formation copy number, which is obtained by subtracting the minimum image formation copy number from a desired image formation copy number set by said setting means, to the image forming apparatus which has read the original; and second control means for executing a control to suspend image formation in the image forming apparatus which has read the original, when image formation of said predetermined minimum image formation copy number distributed by the first control means is finished, to redistribute the predetermined minimum image formation copy number to the image forming apparatus to which the second transmission means has transmitted the image data, and to redistribute a remainder image formation copy number, which is obtained by subtracting the minimum image formation copy number from the suspended image formation copy number, to the image forming apparatus which has read the original.

2. An image forming system according to claim 1, wherein said setting means is a control panel.

3. An image forming system according to claim 1, wherein said read means is a scanner unit provided in the image forming apparatus.

4. An image forming system according to claim 1, wherein said first and second memory means are hard disk drives.

5. An image forming system according to claim 1, wherein said second control means executes, when the image formation in the image forming apparatus to which said predetermined minimum image formation copy number was distributed is finished and a new interrupt image formation request has come from said image formation apparatus, a control to execute image formation according to the image formation request and not to redistribute the copy number to said image forming apparatus until the image formation is completed.

6. An image forming system according to claim 1, wherein said predetermined minimum image formation copy number distributed by said first and second control means is an image formation copy number which permits quick execution of the new interrupt image formation request coming from said image formation apparatus.

7. An image forming system according to claim 1, wherein the image formation based on the image formation copy numbers distributed by said first and second control means is executed by printer units provided in the respective image forming apparatuses.

8. An image forming system wherein a first image forming apparatus and a second image forming apparatus are connected to a controller for controlling them, said first image forming apparatus comprising:

setting means for setting image formation of a desired copy number with use of said first and second image forming apparatuses, with an image on an original being read;

read means for optically scanning the original and reading an image;

first memory means for storing image data read by the read means or image data transmitted from the controller; and first transmission means for transmitting the image data read by the read means to the controller, said controller comprising:

second memory means for storing the image data transmitted by the first transmission means;

second transmission means for transmitting the image data stored in the second memory means to the second image forming apparatus;

first control means for executing, when the reading by the read means has been finished, a control to distribute a predetermined minimum image formation copy number to the second image forming apparatus, and to distribute a remainder image formation copy number, which is obtained by subtracting the minimum image formation copy number from a desired image formation copy number set by said setting means, to the first image forming apparatus; and second control means for executing a control to suspend image formation in the first image forming apparatus, when image formation in the second image forming apparatus of said predetermined minimum image formation copy number distributed by the first control means is finished, to redistribute the predetermined minimum image formation copy number to the second image forming apparatus, and to redistribute a remainder image formation copy number, which is obtained by subtracting the minimum image formation copy number from the suspended image formation copy number, to the first image forming apparatus.

9. An image forming system according to claim 8, wherein said second control means executes, when the image formation in the second image forming apparatus is finished and a new interrupt image formation request has come from said second image formation apparatus, a control to execute image formation according to the image formation request and not to redistribute the copy number to said second image forming apparatus until the image formation is completed.

* * * * *